US012117008B2

(12) United States Patent
Lee

(10) Patent No.: US 12,117,008 B2
(45) Date of Patent: Oct. 15, 2024

(54) IMPELLER-TYPE EXHAUST APPARATUS FOR BLOCKING ELECTRIC HEAT

(71) Applicant: Hyun Gyu Lee, Seoul (KR)

(72) Inventor: Hyun Gyu Lee, Seoul (KR)

( * ) Notice: Subject to any disclaimer, the term of this patent is extended or adjusted under 35 U.S.C. 154(b) by 191 days.

(21) Appl. No.: 17/762,880

(22) PCT Filed: Sep. 23, 2020

(86) PCT No.: PCT/KR2020/012888
§ 371 (c)(1),
(2) Date: Mar. 23, 2022

(87) PCT Pub. No.: WO2021/060838
PCT Pub. Date: Apr. 1, 2021

(65) Prior Publication Data
US 2022/0341433 A1 Oct. 27, 2022

(30) Foreign Application Priority Data
Sep. 24, 2019 (KR) ........................ 10-2019-0117367

(51) Int. Cl.
*F04D 25/08* (2006.01)
*F04D 17/16* (2006.01)
*F04D 29/28* (2006.01)
*F04D 29/30* (2006.01)
*F04D 29/58* (2006.01)

(52) U.S. Cl.
CPC ........... *F04D 17/162* (2013.01); *F04D 25/08* (2013.01); *F04D 29/283* (2013.01); *F04D 29/30* (2013.01); *F04D 29/5853* (2013.01); *F05D 2210/12* (2013.01)

(58) Field of Classification Search
CPC ........ F04D 17/08; F04D 17/10; F04D 23/001; F04D 23/003; F04D 25/02; F04D 25/06; F04D 25/08; F04D 25/082; F04D 25/16; F04D 29/18; F04D 29/185; F04D 29/26; F04D 29/263; F04D 29/28; F04D 29/281; F04D 29/30; F04D 29/58; F04D 29/5806; F04D 29/582; F04D 29/584;
(Continued)

(56) References Cited

U.S. PATENT DOCUMENTS 2,201,867 A * 5/1940 McMahan ........... F04D 29/4246
415/208.3
6,283,726 B1 * 9/2001 Fackelmann ....... F04D 29/5806
415/58.4

(Continued)

FOREIGN PATENT DOCUMENTS

| | | | |
|---|---|---|---|
| JP | 3110209 | U | 6/2005 |
| JP | 6239340 | B2 | 11/2017 |

(Continued)

*Primary Examiner* — Kenneth J Hansen
*Assistant Examiner* — Chirag Jariwala
(74) *Attorney, Agent, or Firm* — NKL Law; Jae Youn Kim

(57) ABSTRACT

Proposed is an impeller-type exhaust apparatus for blocking transfer of heat including a first disc facing a high-temperature gas, a second disc spaced apart from the first disc to form a heat blocking space, a plurality of blades formed along the circumferences of the first disc and the second disc, and a motor which provides rotary power to the first disc and the second disc, wherein heat can be blocked through the heat blocking space.

3 Claims, 5 Drawing Sheets

(58) Field of Classification Search
CPC ............. F04D 29/5846; F04D 29/5853; F04D 17/162; F04D 29/282; F04D 29/283
USPC .............. 415/98–99, 101–103; 416/184, 187
See application file for complete search history.

(56) References Cited

U.S. PATENT DOCUMENTS

| | | | | |
|---|---|---|---|---|
| 6,345,956 | B1 * | 2/2002 | Lin | F04D 29/282<br>416/200 R |
| 6,951,241 | B1 * | 10/2005 | Gatley | F23L 17/005<br>126/516 |
| 9,995,316 | B2 * | 6/2018 | Hall | F04D 29/667 |
| 2012/0121409 | A1 * | 5/2012 | Liu | F04D 29/023<br>415/215.1 |
| 2017/0234323 | A1 * | 8/2017 | Pirouzpanah | F04D 29/424<br>417/321 |
| 2020/0207180 | A1 * | 7/2020 | Cho | F04D 25/082 |

FOREIGN PATENT DOCUMENTS

| | | | | |
|---|---|---|---|---|
| KR | 200439764 | Y1 * | 5/2008 | F04D 25/06 |
| KR | 10-1276516 | B1 | 6/2013 | |
| KR | 10-2013-0077852 | A | 7/2013 | |
| WO | 2013-126277 | A1 | 8/2013 | |

* cited by examiner

IMPELLER-TYPE EXHAUST APPARATUS FOR BLOCKING ELECTRIC HEAT

TECHNICAL FIELD

The present disclosure relates to an impeller-type exhaust apparatus for blocking transfer of heat and, more particularly, to an impeller-type exhaust apparatus for blocking transfer of heat, which prevents a motor from being burned by blocking the motor from being heated by the high-temperature combustion gas discharged to the outside through a chimney.

BACKGROUND ART

In general, exhaust systems are referred to as ventilators, exhaust fans, etc. The exhaust system is mainly installed at the ends of various exhaust vents, chimneys (stacks), flues, and ducts provided in apartments, shopping malls, factories, subways, boilers, stoves, etc. to discharge air to the outside by creating a negative pressure.

A stove, which is one of the heating devices, burns fuel such as wood, coal, oil, gas, and pellets in a combustion chamber to obtain heat, and the combustion gas generated by the combustion of the fuel is discharged to the outside through the chimney. The exhaust system is provided at the end of the chimney to make the inside of the chimney into a negative pressure state by the operation of the exhaust system, suck the combustion gas generated from the combustion chamber into the chimney, and introduce air from the outside of the combustion chamber into the combustion chamber to facilitate fuel combustion.

As such, the exhaust system for smoothly discharging the combustion gas is fixed to the end of the chimney. The exhaust system consists of a housing having an inlet through which the combustion gas of the chimney is introduced and an exhaust port for exhausting the combustion gas introduced through the inlet to the outside, an impeller provided at the inlet of the housing to suck air from the chimney by rotation, and a motor installed inside the housing and provides rotary power to the impeller.

However, the conventional exhaust system as described above has a problem in that the motor rotating the impeller is easily damaged by thermal shock because it is continuously exposed to the burnt gas that has moved from the combustion chamber of the stove to the chimney.

In other words, in the exhaust system installed in the chimney, the motor is located above the impeller, and the impeller and the motor are shaft coupled. Here, the exhaust system has a structure in which the high-temperature combustion gas passes through the impeller since the impeller is installed so that the combustion gas of the chimney flows in the same direction in the shaft coupling direction of the impeller and the motor.

For this reason, as the high-temperature combustion gas passes through the impeller, a portion of the combustion gas heats the motor and the motor is burned and damaged by thermal shock, which is problematic.

DISCLOSURE

Technical Problem

The present disclosure has been made keeping in mind the problems occurring in the related art. An objective of the present disclosure is to provide an impeller-type exhaust apparatus for blocking transfer of heat, which can prevent the motor from being damaged by thermal stress by blocking the motor from being heated by the high-temperature gas discharged to the outside through a pipe such as a chimney.

Especially, an objective of the present disclosure is to provide an impeller-type exhaust apparatus for blocking transfer of heat capable of blocking the transfer of heat of high-temperature gas to the motor, and cooling the impeller by external air while discharging the high-temperature gas to one side through the impeller.

Technical Solution

An impeller-type exhaust apparatus for blocking transfer of heat of the present disclosure for achieving the above objectives includes: a first disc having a plate shape and located in a direction intersecting the direction in which high-temperature gas flows; a second disc spaced apart from the first disc to form a heat blocking space; a plurality of blades formed along circumferences of the first disc and the second disc, and configured to integrally connect the first disc and the second disc and rotate together with the first disc and the second disc while allowing the high-temperature gas to flow; and a motor configured to provide rotary power to the first disc and the second disc, wherein the first disc, the second disc, and the blades form an impeller rotated by the motor.

The second disc of the impeller may further include first cooling holes for cooling the first disc by introducing external air into the heat blocking space.

The impeller may further include a third disc provided in the heat blocking space between the first disc and the second disc to partition the first disc and the second disc, configured to block heat emitted from the first disc from transferring to the second disc by acting as a shield between the first disc and the second disc and to dissipate heat transferred from the first disc.

The third disc may be configured to have a diameter smaller than the diameter of at least one of the first disc and the second disc, and in the heat blocking space, a flow path may be provided for guiding the external air introduced into the heat blocking space to the first disc through an outside of a rim of the third disc having a diameter smaller than the diameter of the first disc or the second disc.

The blades may include: first blades extending downward from a lower surface of the first disc; second blades extending upward from an upper surface of the second disc; and third blades provided in the heat blocking space and integrally connecting the upper surface of the first disc and the lower surface of the second disc.

The first blades and the second blades may be disposed outside the heat blocking space as the first blades and the second blades may be provided on the lower surface of the first disc and the upper surface of the second disc.

In the impeller, heat transfer to the motor by the first disc may be suppressed as a rotating shaft of the motor is coupled to the second disc to maintain a state in which the rotating shaft is spaced apart from the first disc by the heat blocking space.

The present disclosure further includes: a housing in which at least one of the first disc and the second disc of the impeller is installed in a built-in state, and formed in a shape of a box with an open top and bottom to have a discharge hole on a side.

In the housing, the impeller may be installed in a state where the first disc is built-in and the second disc is exposed above the top of the housing.

Here, it is preferable that the first cooling hole is formed between each blade.

In addition, it is preferable that the blades extend to the outside of the first disc and the second disc.

Further, it is preferable that the third disc has second cooling holes for allowing the fluid to pass between the first disc and the second disc.

Advantageous Effects

The impeller-type exhaust apparatus for blocking transfer of heat of the present disclosure can prevent the motor from being damaged by thermal stress caused by high heat because it is possible to prevent heat from being transferred to the motor by a high-temperature gas such as combustion gas or heat from the first disc through the heat blocking space configured by the separation between the first and second discs of the impeller.

In particular, the rotating shaft of the motor is connected to the second disc of the impeller so that the motor components are substantially separated from the first disc, thereby protecting the motor from high heat.

In addition, the impeller-type exhaust apparatus for blocking transfer of heat of the present disclosure can prevent the motor from heating up and burning out since in the second disc of the impeller close to the motor, second blades and first cooling holes for introducing external air into the first disc are formed to rapidly cool the first disc and to suppress the transfer of the heat transferred from the combustion gas to the first disc to the motor through the second disc and the rotating shaft.

Additionally, since the third disc provided in the heat blocking space between the first and second discs of the impeller blocks the heat emitted from the first disc and substantially increases the heat dissipation area of the first disc, it is possible to quickly cool the heat blocking space and the first disc by using the external air, thereby preventing the motor from being damaged.

Further, since the third disc of the impeller has a smaller diameter than the first disc and/or the second disc, it is possible to provide a flow path for guiding the external air to the first disc through the outside of the rim, enabling smoother cooling of the first disc.

In addition, the first blades and the second blades, provided on the first disc and the second disc respectively of the impeller, are installed on the lower surface of the first disc and the upper surface of the second disc respectively, and are located outside the heat blocking space, so that combustion gas and external air can be smoothly discharged and supplied.

Furthermore, since at least one of the first and second discs of the impeller is built into the housing having the discharge hole, combustion gas can be discharged through the discharge hole of the housing, and when the second disc is installed to be exposed to the outside of the housing, external air outside the housing can be smoothly supplied to the inside of the housing.

BEST MODE

The terms or words used in this specification and claims should not be construed as being limited to their ordinary or dictionary meanings, but should be interpreted as meanings and concepts consistent with the technical idea of the present disclosure based on the principle that the inventor can appropriately define the concept of a term in order to explain his/her invention in the best way.

Hereinafter, an impeller-type exhaust apparatus for blocking transfer of heat according to an embodiment of the present disclosure will be described with reference to the accompanying drawings.

The impeller-type exhaust apparatus for blocking transfer of heat according to the embodiment of the present disclosure, as shown, includes: a first disc 100 having a plate shape and located in a direction intersecting the direction in which high-temperature gas such as combustion gas (hereinafter referred to as "combustion gas") flows; a second disc 200 spaced apart from the first disc 100 to form a heat blocking space S, and shaft coupled with a motor 10; and a plurality of blades 300 formed along circumferences of the first disc 100 and the second disc 200, and configured to integrally connect the first disc 100 and the second disc 200 and to allow the high-temperature fluid to flow by rotary power provided from the motor 10.

Additionally, an exhaust system is installed in the flue of the stove, boiler, etc. to create a negative pressure inside the flue in order to forcibly exhaust the high-temperature combustion gas moving along the flue to the outside of the flue.

Figure 1:
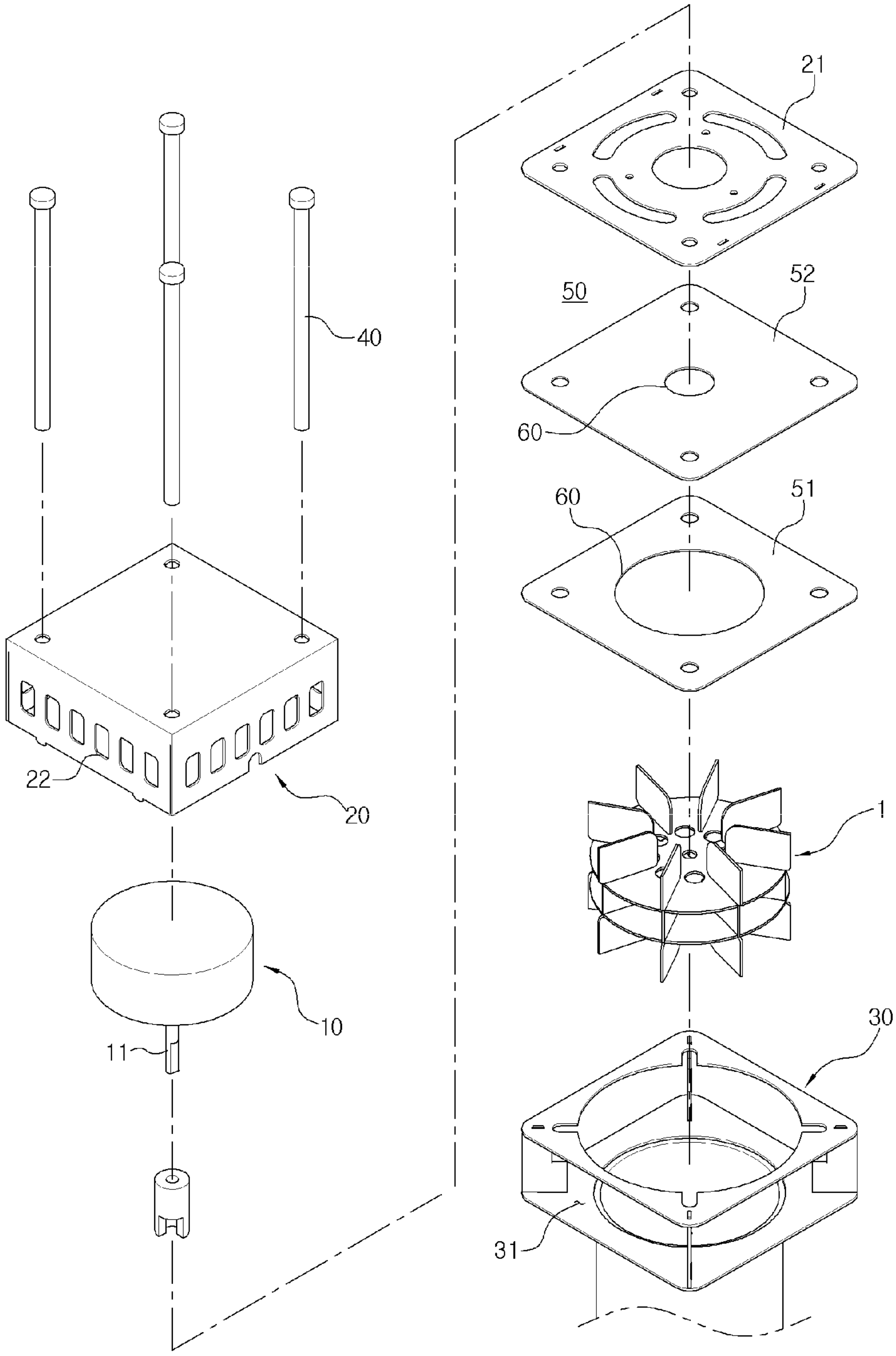
FIG. 1 is an exploded perspective view of an impeller-type exhaust apparatus for blocking transfer of heat according to the present disclosure.

As shown in FIG. 1, the exhaust system consists of an impeller 1 positioned at the end of the flue, a motor 10 providing rotary power to the impeller 1, a casing 20 surrounding the motor so that the motor is not exposed to the outside, and a housing 30 that allows the casing 20 to be installed at the end of the flue and surrounds and protects the perimeter of the impeller 1.

The casing 20 has the shape of a box with an open bottom, and a base plate 21 on which the motor 10 is mounted is provided in the open bottom portion of the casing 20, and heat emission holes 22 for discharging the heat generated when the motor 10 is operated to the outside of the casing 20 are formed along the sides of the casing 20.

Meanwhile, the impeller 1, which receives rotary power from the motor 10 and rotates to form a negative pressure inside the flue, is located inside the housing 30 to prevent the impeller 1 from being damaged by an external force.

In this way, the housing 30 that surrounds and protects the perimeter of the impeller 1 has the shape of a box with an open top and a bottom, and a discharge hole 31 through which combustion gas is discharged is formed along the side of the housing 30.

The housing 30 is integrated with the casing 20 by binding members 40 such as bolts penetrating the casing 20. The binding members 40 are screwed with the end of the flue so that the casing 20 and the housing 30 in which the motor 10 and the impeller 1 are respectively provided are integrated and fixed to the end of the flue T constituting a pipe to exhaust the high-temperature gas.

In addition, a plurality of baffle plates 50 are provided between the casing 20 and the housing 30. Here, the baffle plates 50 are fixed at regular intervals while being penetrated by the binding members 40 that integrally connect the casing 20 and the housing 30.

Figure 4:
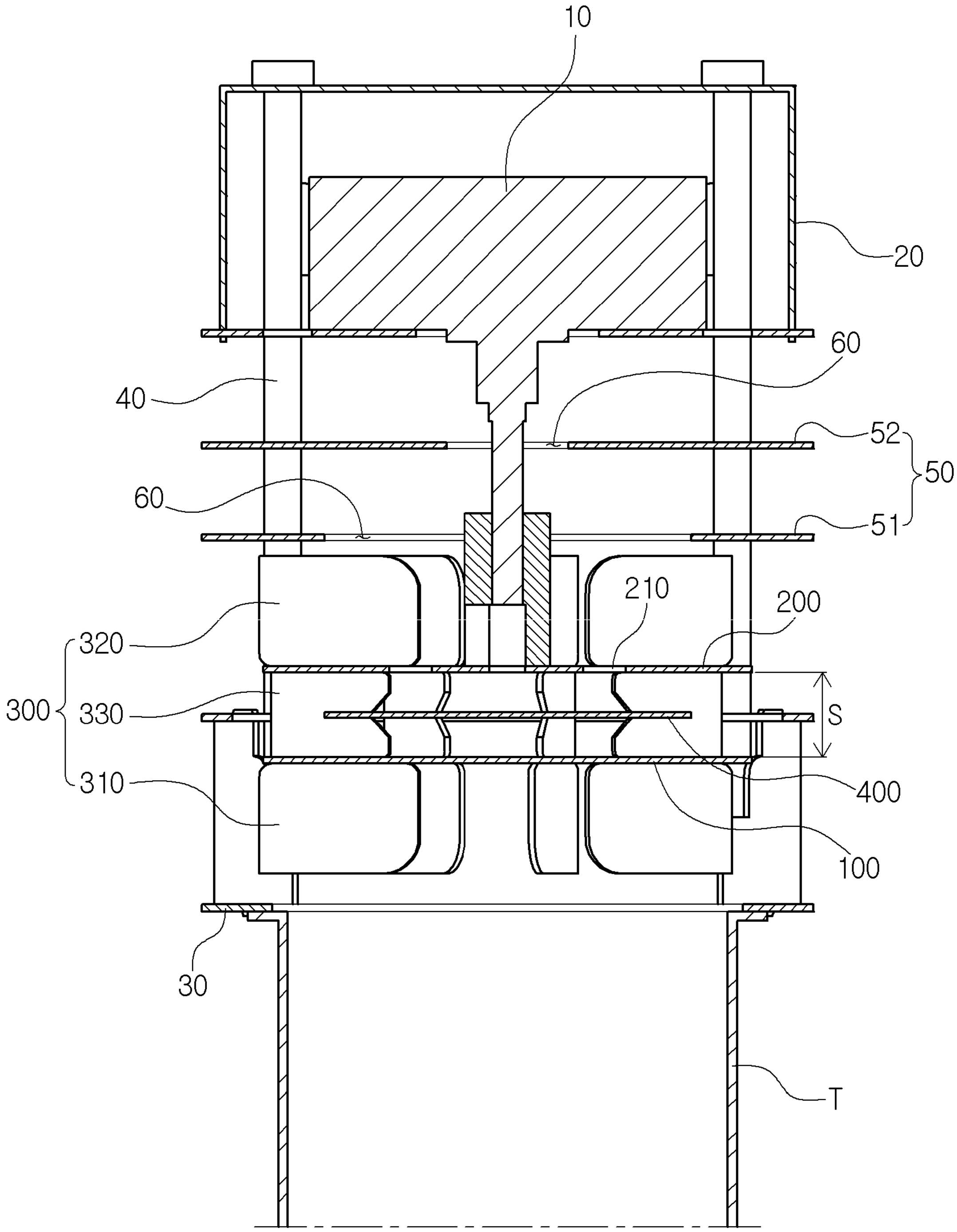
FIG. 4 is a longitudinal cross-sectional perspective view of the exhaust apparatus shown in FIG. 1.
Figure 5:
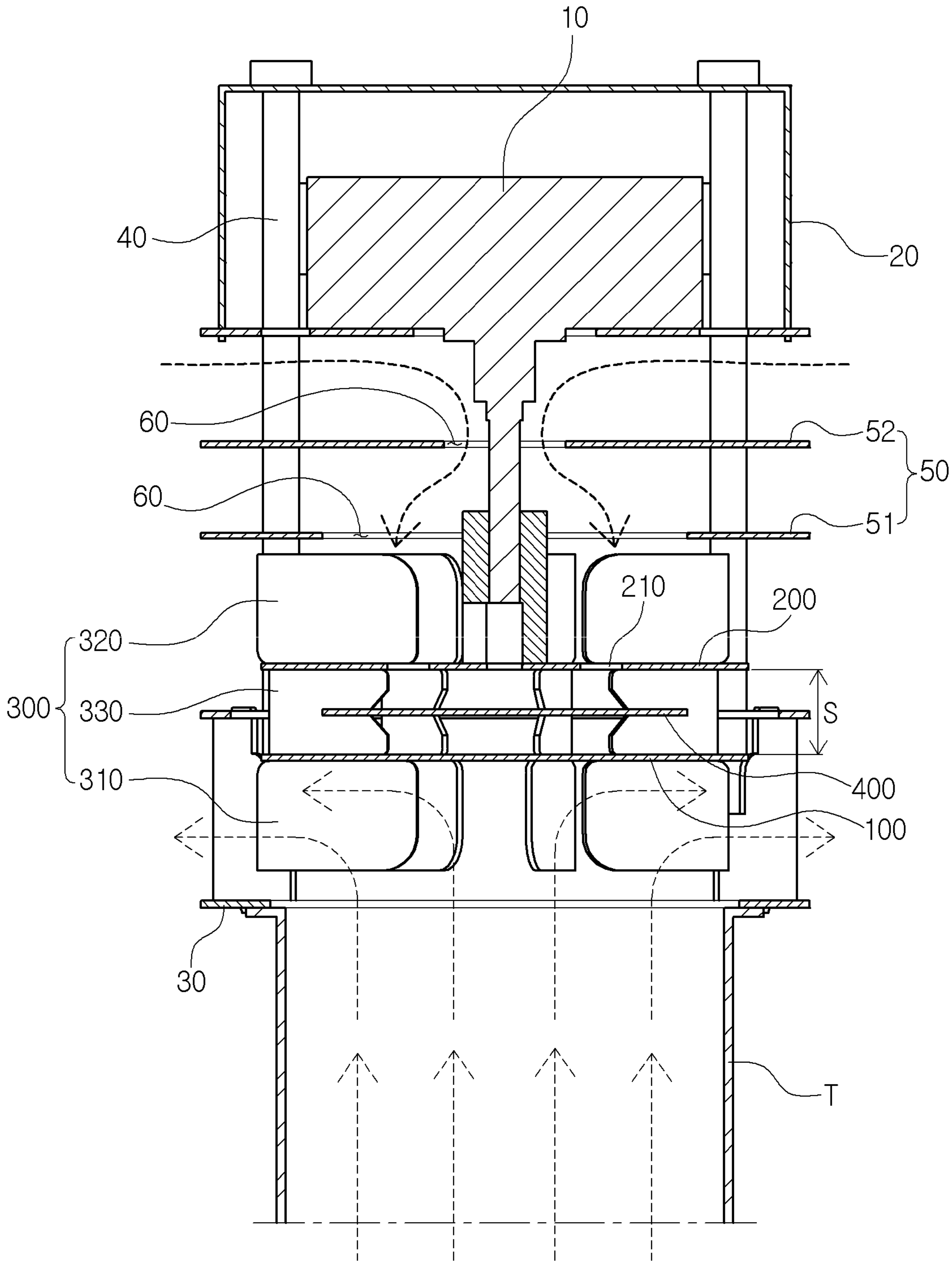
FIG. 5 is a longitudinal cross-sectional view showing the use state of the exhaust apparatus shown in FIG. 4.

The plurality of baffle plates 50 may be divided into a first baffle plate 51 close to the impeller 1 and a second baffle plate 52 close to the motor 10, for example, as shown in FIGS. 4 and 5.

At this time, the first baffle plate 51 and the second baffle plate 52 penetrated by the binding members 40 are fixed to the surfaces of the binding members 40 by welding, or the first baffle plate 51 and the second baffle plate 52 are fixed at regular intervals between the casing 20 and the housing 30 by spacing members such as spacers provided between the casing 20, the baffle plates 50, and the housing 30.

As above, the first baffle plate 51 and the second baffle plate 52 provided between the casing 20 and the housing 30 have a through hole 60 respectively formed thereof so as to be penetrated by the rotating shaft 11 connecting the motor 10 and the impeller 1.

Here, the through hole 60 respectively formed in the first baffle plate 51 and the second baffle plate 52 has a larger diameter than the outer diameter of the rotating shaft 11 so that the rotating shaft 11 connecting the motor 10 and the impeller 1 rotates smoothly when rotating.

Additionally, as shown in FIGS. 4 and 5, the first baffle plate 51 and the second baffle plate 52 through which the rotating shaft 11 of the motor 10 passes have through holes 60 of different diameter sizes, and preferably, the diameter of each of the through holes 60 formed in the baffle plates 50 increases from the motor 10 to the impeller 1.

In other words, as shown in FIGS. 4 and 5, the diameter of the through hole 60 formed in the first baffle plate 51 close to the impeller 1 is larger than the diameter of the through hole 60 formed in the second baffle plate 52 close to the motor 10.

As such, since the diameter of the through hole 60 formed in the first baffle plate 51 is larger than the diameter of the through hole 60 formed in the second baffle plate 52, as the impeller 1 rotates, the external air between the first baffle plate 51 and the second baffle plate 52 is provided to the impeller 1 through the through hole 60 of the first baffle plate 51, quickly cooling the impeller 1 heated by the combustion gas.

Here, in the case of the above-described first baffle plate 51 and second baffle plate 52, as shown in FIG. 4, the binding members 40 are prevented from moving in the transverse direction since a plurality of binding members 40 are penetrated and fixed in a spaced apart state. That is, the first baffle plate 51 and the second baffle plate 52 are flow preventing members that restrain the plurality of binding members 40 to prevent the movement of the binding members 40. The flow preventing members may be composed of the first baffle plate 51 and the second baffle plate 52 as shown. On the other hand, if the movement of the binding members 40 is prevented even if the flow preventing member is composed of only one of the first baffle plate 51 and the second baffle plate 52, the flow preventing member may be composed of only one of the first baffle plate 51 and the second baffle plate 52.

Figure 2:
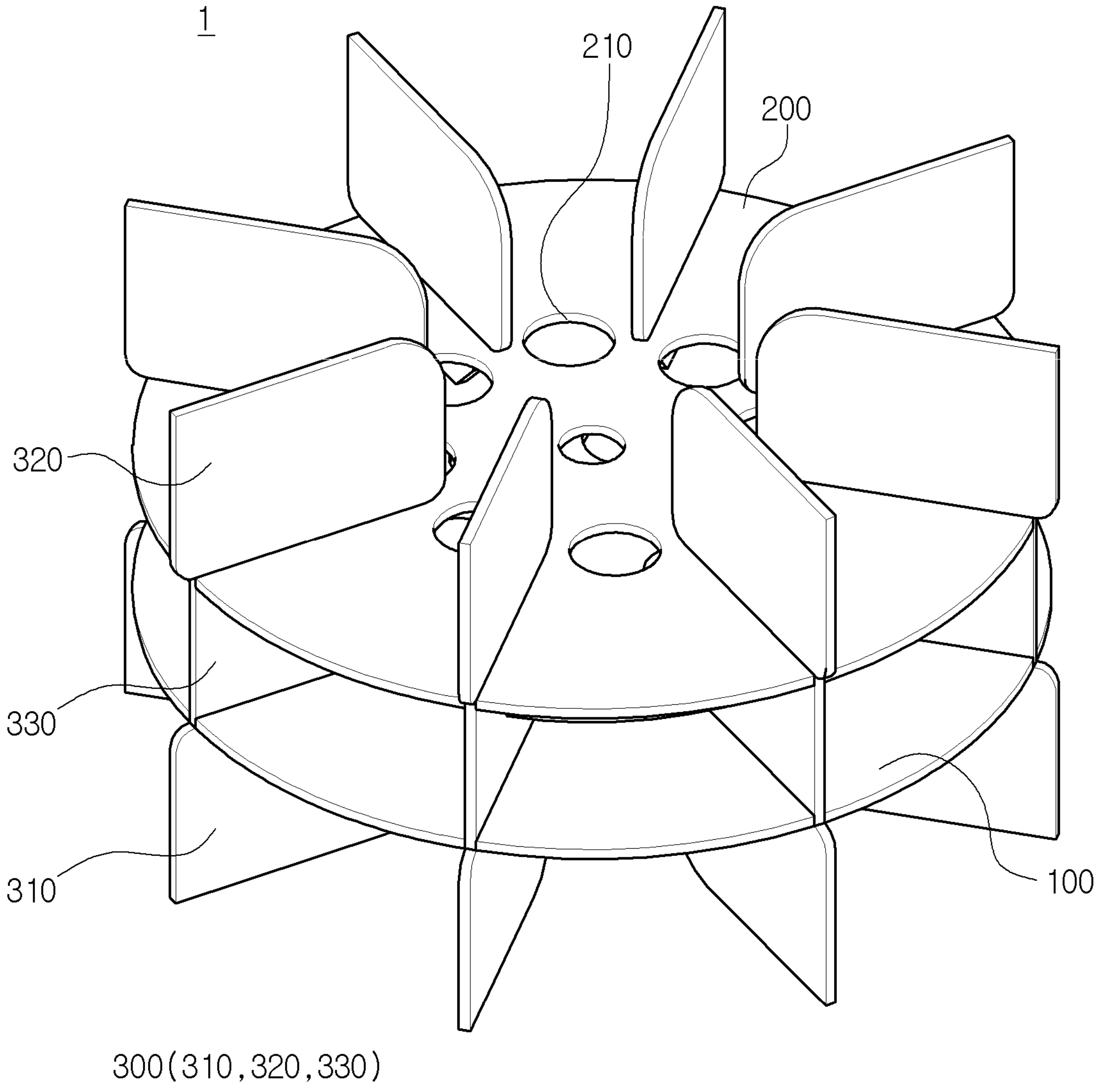
FIG. 2 is a perspective view of the impeller shown in FIG. 1.
Figure 3:
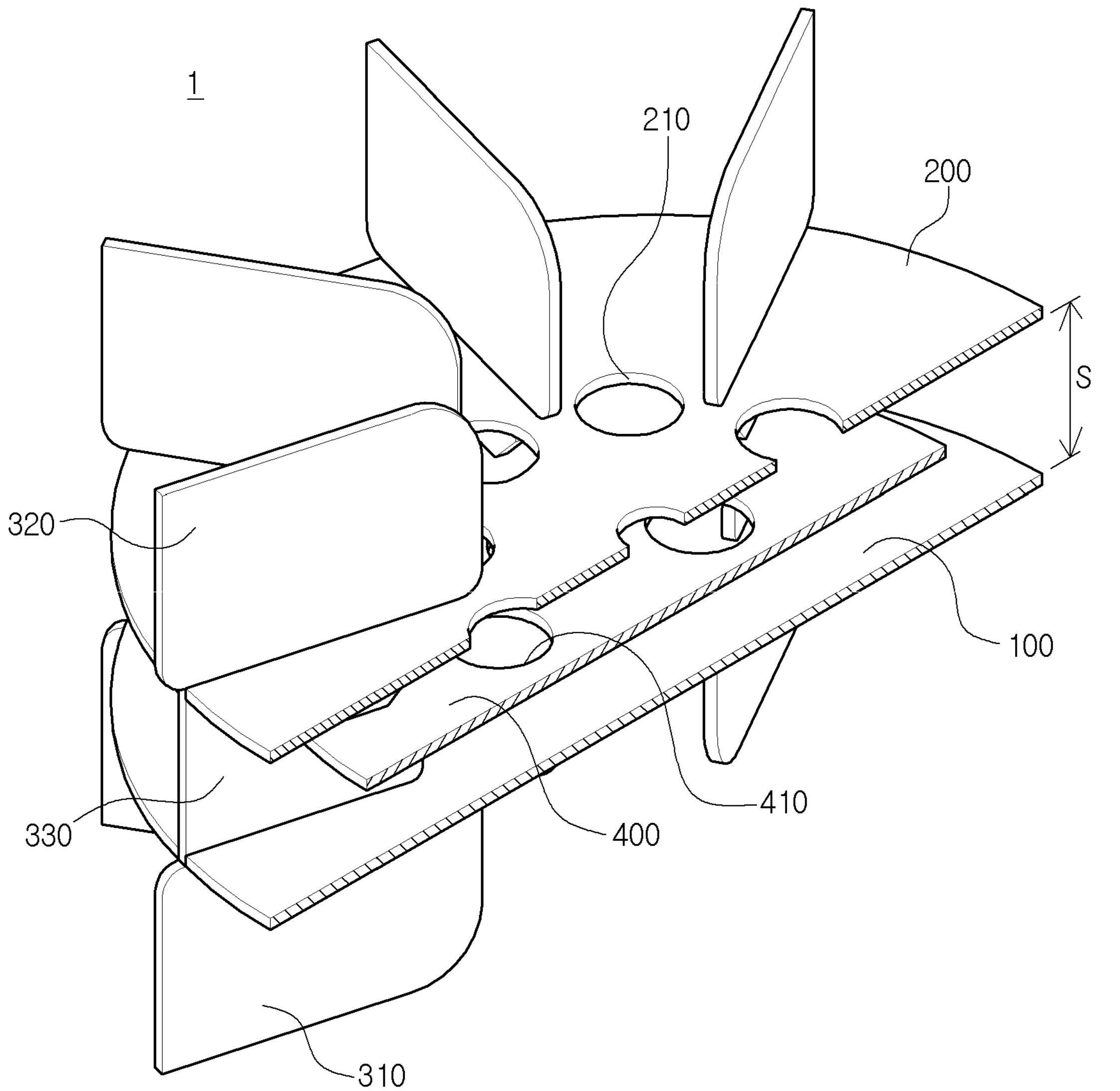
FIG. 3 is a longitudinal cross-sectional perspective view of the impeller shown in FIG. 2.

Meanwhile, the impeller 1 provided inside the housing 30 and heated in direct contact with the combustion gas of the flue, as shown in FIGS. 2 and 3, includes: a first disc 100 located at the end of the flue and located in a direction intersecting the flow direction of the combustion gas; a second disc 200 spaced apart from the first disc 100 to form a heat blocking space S, and shaft coupled with a motor 10; and a plurality of blades 300 formed along circumferences of the first disc 100 and the second disc 200, and configured to integrally connect the first disc 100 and the second disc 200 and to allow the combustion gas to flow.

Additionally, the first disc 100 and the second disc 200, as shown in FIGS. 1 to 3, form an outer diameter smaller than the inner diameter of the flue, and the second disc 200 is spaced apart from the upper part of the first disc 100 to form the heat blocking space S between the first disc 100 and the second disc 200.

The first disc 100 is formed in a plate shape so that the combustion gas from the flue cannot flow to the motor 10, and the second disc 200 has first cooling holes 210 for cooling the first disc 100 by introducing external air into the heat blocking space. In addition, the second disc 200 rotates by the rotary power provided according to the operation of the motor 10 by being shaft coupled with the rotating shaft 11 of the motor 10.

The first disc 100 and the second disc 200 are integrally formed by the blades 300 so that the impeller 1 rotates by the rotary power provided according to the operation of the motor 10. The plurality of blades 300 are formed along the circumferences of the first disc 100 and the second disc 200, and vertically connect the first disc 100 and the second disc 200.

The blades 300 extend to the outside of the first disc 100 and the second disc 200 to facilitate the flow of combustion gas and external air outside the flue. The blades 300 consist of first blades 310 extending downward from the lower surface of the first disc 100, second blades 320 extending upward from the upper surface of the second disc 200, and third blades 330 integrally connecting the upper surface of the first disc 100 and the lower surface of the second disc 200.

The blades 300 as described above may be such that the first blades 310, the second blades 320, and the third blades 330 are integrally formed and then integrally formed by being welded through the circumferences of the first disc 100 and the second disc 200, or the first blades 310, the second blades 320, and the third blades 330 are respectively formed and then integrally formed by being respectively welded to the first disc 100 and the second disc 200.

In addition, as shown in FIGS. 1 to 3, the blades 300 may be formed vertically from the upper and lower surfaces of the first disc 100 and the second disc 200, but may form a curvature to favor the flow of the combustion gas and external air according to the rotational direction of the impeller 1 in some cases.

Additionally, as above, when the blades 300 are formed on the first disc 100 and the second disc 200, the first cooling hole 210 formed on the second disc 200 is formed between the blades 300. As described, as the first cooling hole 210 formed in the second disc 200 is formed between the second blades 320, the external air remaining above the second disc 200 is introduced into the first disc 100 through the first cooling hole 210 by the rotation of the impeller 1, comes into contact with the combustion gas, and cools the heated first disc 100.

Meanwhile, as shown in FIGS. 4 and 5, the aforementioned impeller 1 is installed in the housing 30 such that at least one of the first disc 100 and the second disc 200 is embedded in the housing 30. It is preferable that the impeller 1 is installed in the housing 30 in a state in which the first disc 100 is embedded in the housing 30 so that the above-described first blades 310 exhaust the combustion gas to the outside of the housing 30 as will be described later and the second blades 320 and/or the third blades 330 may introduce external air into the heat blocking space S.

On the other hand, as shown in FIGS. 4 and 5, the third blades 330 are provided in the heat blocking space S and integrally connect the upper surface of the first disc 100 and the lower surface of the second disc 200, and cool the first disc 100 by introducing the external air remaining above the second disc 200 through the first cooling holes 210 into the heat blocking space S when the impeller 1 rotates. The first blades 310 extend downward from the lower surface of the first disc 100 as shown, and as the first blades 310 are built into the housing 30 as described above, the combustion gas is exhausted through the discharge hole 31 provided on the side of the housing 30. The second blades 320 guide the surrounding external air to the first cooling holes 210 as the second blades 320 extend upward from the upper surface of the second disc 200.

Conclusionally, as shown in FIGS. 4 and 5, in the impeller 1, the first disc 100 is embedded in the housing 30 and the second disc 200 is exposed outside the top of the housing 30. Accordingly, in the impeller 1, the first blades 310 are built into the housing 30, the second blades 320 are exposed outside the top of the housing 30, and about half of the third blades 330 are embedded in the housing 30 and about half of the third blades 330 are exposed. As such, the impeller 1 discharges combustion gas through the first blades 310 during rotation, and introduces external air through the second blades 320 and the third blades 330 to cool the first disc 100.

On the other hand, a third disc 400 dividing between the first disc 100 and the second disc 200 may be formed in the heat blocking space S formed between the first disc 100 and the second disc 200. Here, the third disc 400 has a smaller outer diameter than the first disc 100 and the second disc 200 so that a flow path through which the external air introduced into the heat blocking space S through the first cooling holes 210 of the second disc 200 may move to the first disc 100 is formed.

Further, in the third disc 400, second cooling holes 410 for passing gas between the first disc 100 and the second disc 200 are formed so that the external air introduced into the heat blocking space S through the first cooling holes 210 formed in the second disc 200 is introduced into the second cooling holes 410 formed in the third disc 400, cooling the first disc 100.

In this way, as the third disc 400 is formed in the heat blocking space S, it is possible to block the movement of the combustion gas from the flue toward the motor 10, and as heat transferred to the first disc 100 in contact with the combustion gas moves to the third disc 400 and the heat dissipation area in the heat blocking space S increases, the external air introduced into the heat blocking space S through the first cooling holes 210 of the second disc 200 rapidly cools the third disc 400 and the first disc 100.

In addition, as shown in FIGS. 4 and 5, the third disc 400 blocks between the first disc 100 and the second disc 200, preventing the heat emitted from the first disc 100 from transferring to the second disc 200. Therefore, as described above, the third disc 400 blocks heat transfer and increases the heat dissipation area, so that the first disc 100 is smoothly cooled.

Here, as shown in FIGS. 4 and 5, the above-described third disc 400 is fixed to the third blades 330 by welding or bolting. The third disc 400 is configured to have a smaller diameter than the diameter of the first disc 100 or the second disc 200, so it is desirable that the edge of the third disc 400 is fitted to the inner end of the third blades 330 and fixed as shown. Accordingly, the third disc 400 is easily fixed to the third blades 330.

Meanwhile, the impeller 1 rotates by the motor 10 as the rotating shaft 11 of the motor 10 is coupled to the second disc 200. As the motor 10 maintains a state in which the rotating shaft 11 is spaced apart from the first disc 100 through the heat blocking space S, heat from the first disc 100 is not transferred to the motor 10. That is, the motor 10 is prevented from being heated by the heat of the combustion gas as the heat transfer of the first disc 100 is blocked by the heat blocking space S. In particular, since the third disc 300 additionally blocks heat transfer between the first disc 100 and the second disc 200, and emits the heat of the first disc 100, the motor 10 is further prevented from being heated by the combustion gas.

In the impeller-type exhaust apparatus for blocking transfer of heat according to the present disclosure having the configuration as described above, the first disc 100 that is in direct contact with the combustion gas and the second disc 200 that is shaft coupled with the motor 10 to receive rotary power are spaced apart from each other to form a heat blocking space S, thereby preventing the motor 10 from being heated and burned by the combustion gas.

In addition, since the second blades 320 and a first cooling holes 210 for introducing external air into the first disc 100 are formed in the second disc 200 close to the motor 10 to quickly cool the first disc 100, the heat transferred from the combustion gas to the first disc 100 is prevented from being transferred to the motor 10 through the second disc 200 and the rotating shaft 11, thereby preventing the motor from being heated and burned.

Further, according to the present disclosure, since the third disc 400 is formed in the heat blocking space S formed between the first disc 100 and the second disc 200 to increase the heat dissipation area in the heat blocking space S, it is possible to quickly cool the heat blocking space S by the external air, thereby preventing the motor 10 from being damaged.

Meanwhile, the present disclosure is not limited to the above-described embodiment, but can be implemented with modifications and variations without departing from the gist of the present disclosure, and it should be considered that such modifications and variations are also included in the technical spirit of the present disclosure.

For example, in the previous description, the impeller 1 is described as being provided at the end of the flue T, however, in some cases, it may be installed in various exhaust vents, chimneys, ducts, and ventilation holes provided in apartments, shopping malls, factories, subways, boilers, stoves, etc.

The invention claimed is:

1. An impeller exhaust apparatus for blocking transfer of heat, the apparatus comprising:
- a first disc having a plate shape and located in a direction intersecting a direction in which gas flows;
- a second disc spaced apart from the first disc to form a heat blocking space;
- a plurality of blades formed along circumferences of the first disc and the second disc, and configured to integrally connect the first disc and the second disc and rotate together with the first disc and the second disc while allowing the gas to flow; and
- a motor configured to provide rotary power to the first disc and the second disc,
- wherein the first disc, the second disc, and the plurality of blades form an impeller rotated by the motor,
- wherein, in the impeller, first cooling holes for cooling the first disc by introducing external air into the heat blocking space are provided in the second disc, wherein the impeller further includes a third disc provided in the heat blocking space between the first disc and the second disc to partition the first disc and the second disc, configured to block heat emitted from the first disc from transferring to the second disc by acting as a shield between the first disc and the second disc and to dissipate heat transferred from the first disc, and wherein the third disc is configured to have a diameter smaller than a diameter of at least one of the first disc and the second disc, and in the heat blocking space a flow path is provided for guiding an external air introduced into the heat blocking space, to the first disc through an outside of a rim of the third disc having the diameter smaller than the diameter of the at least one of the first disc or the second disc.

2. The impeller exhaust apparatus for blocking transfer of heat of claim 1, wherein in the impeller, heat transfer to the motor by the first disc is suppressed as a rotating shaft of the motor is coupled to the second disc to maintain a state in which the rotating shaft is spaced apart from the first disc by the heat blocking space.

3. An impeller exhaust apparatus for blocking transfer of heat, the apparatus comprising:

a first disc having a plate shape and located in a direction intersecting a direction in which gas flows;

a second disc spaced apart from the first disc to form a heat blocking space;

a plurality of blades formed along circumferences of the first disc and the second disc, and configured to integrally connect the first disc and the second disc and rotate together with the first disc and the second disc while allowing the gas to flow; and a motor configured to provide rotary power to the first disc and the second disc, wherein the first disc, the second disc, and the plurality of blades form an impeller rotated by the motor, wherein the plurality of blades include:

first blades extending downward from a lower surface of the first disc;

second blades extending upward from an upper surface of the second disc; and third blades provided in the heat blocking space and integrally connecting an upper surface of the first disc and a lower surface of the second disc, wherein the first blades and the second blades are disposed outside the heat blocking space as the first blades and the second blades are provided on the lower surface of the first disc and the upper surface of the second disc, respectively, wherein the impeller exhaust apparatus further comprises a housing in which at least one of the first disc and the second disc of the impeller is installed in a built-in state, wherein the housing is formed in a shape of a box with an open top and bottom, and a discharge hole on a side of the housing, and wherein in the housing, the impeller is installed in a state where the first disc is the built-in state and the second disc is exposed above the open top of the housing.

* * * * *